June 4, 1968 W. S. MORRISON 3,386,754
HOSE COUPLING CONNECT AND DISCONNECT MECHANISM
Filed Oct. 24, 1965
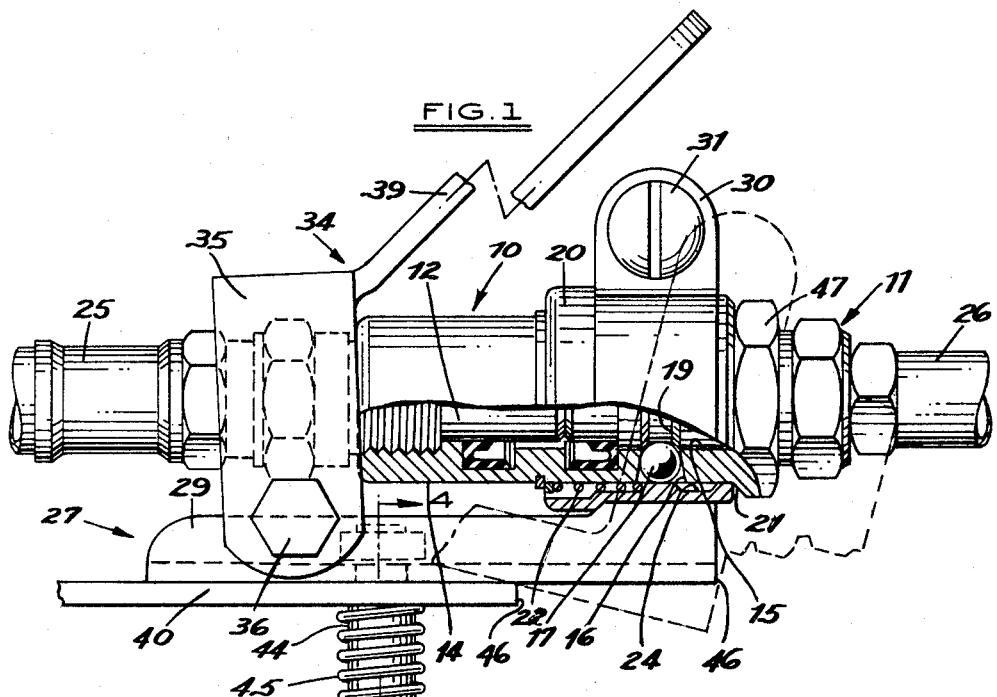
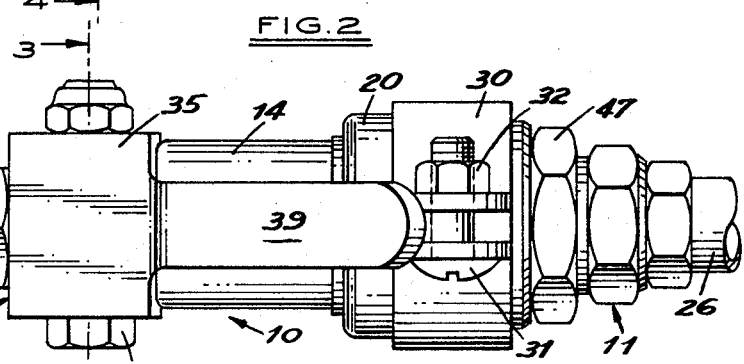
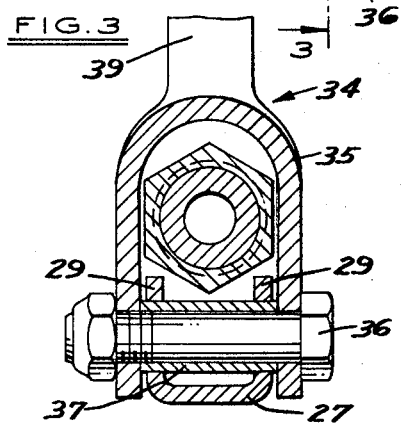
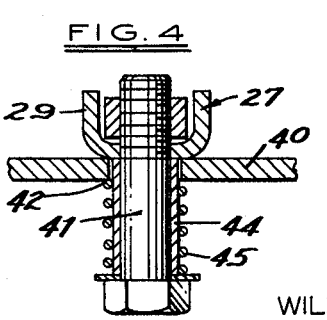
INVENTOR.
WILLIAM S. MORRISON
BY
ATTORNEY

United States Patent Office 3,386,754
Patented June 4, 1968

3,386,754
HOSE COUPLING CONNECT AND
DISCONNECT MECHANISM
William S. Morrison, Royal Oak, Mich., assignor to Ford
Motor Company, Dearborn, Mich., a corporation of
Delaware
Filed Oct. 24, 1965, Ser. No. 504,928
3 Claims. (Cl. 285—1)

ABSTRACT OF THE DISCLOSURE

A hose coupling support and disconnect mechanism for housing couplings having male and female coupling halves retained coupled by displaceable balls engaged with the male half by a spring-biased sleeve for reciprocation of the female half, has a clamp for engaging the sleeve so that overload pull on the hose connected with the male half will separate the couplings. The coupling is supported on a vertical pivot to permit the coupling to swing as required and a lever is mounted on a horizontal pivot extending transversely of the coupling to engage the female half and displace it relative to the sleeve to facilitate uncoupling the male half. The lever is provided with a bifurcated coupling-engaging portion and an operating portion extending above the coupling sleeve at an acute angle to the axis of the coupling female half.

---

This invention relates to tractors and, more particularly, to apparatus for facilitating the coupling and uncoupling of hydraulic hoses extending to an implement attached to the tractor.

Tractors often are provided with a hydraulic system including a pump and at least one hose for supplying hydraulic fluid under pressure to raise or lower an implement or attachment. The implement is also provided with a hose for coupling to the hose of the tractor. At times, two hoses are used, one for a pressure line and the other for a hydraulic return line.

Couplings for joining the hoses of the tractor and implement usually include check valves for retaining the fluid in the hoses upon uncoupling and often include a safety latch that will retain the hoses coupled during normal operation but which will uncouple when subjected to an extraordinary pull as might occur if a towed implement became uncoupled from the tractor so as to exert a pull on the hydraulic hoses. This safety latch often comprises a plurality of displaceable balls located in holes at intervals about the female coupling half and pressed inwardly into a groove in the male coupling half by a spring-biased sleeve. Upon pull on the hose exceeding a predetermined amount, the coupling will pull apart due to displacement of the sleeve so as to permit the coupling to separate, at which time the check valves will close to prevent loss of hydraulic fluid.

When coupling such a connection, it is necessary to displace the sleeve to insert the male coupling half. Also, as the coupling moves together, the spring-biased check valves are unseated by relative motion of the coupling halves to connect the lines, thus requiring compression not only of the spring bias of the sleeve, but also of the two check valve springs. In addition, if there is any hydraulic pressure within either of the lines, additional force is required to unseat the check valves against the hydraulic pressure and couple the two coupling halves.

According to the present invention, a coupling of the type described is supported on the tractor by a member engaging the sleeve of the female coupling half and pivotally supported for swinging movement. A lever is mounted on the sleeve-engaging member for displacing the female coupling half relative to its sleeve in order to facilitate coupling or uncoupling the male coupling half. Preferably, the lever is pivotally mounted for rotation about a horizontal axis and projects at an acute angle to the coupling above the pivotal support.

Among the objects of the present invention are to provide an improved mechanism for facilitating the coupling and uncoupling of hydraulic hose couplings of the type described; to provide such a mechanism which will reduce the manual effort required for coupling and uncoupling such couplings, which is simple and dependable in operation, which will not interfere with automatic safety uncoupling when pull on the coupling exceeds a predetermined force; and generally to improve hose coupling and uncoupling devices of the type described.

Other objects, and objects relating to details of construction and operation will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

FIGURE 1 is a side elevation of a hose coupling and the coupling disconnect device of the present invention, portions of the coupling and the coupling disconnect device being shown in vertical section, a portion of the uncoupling lever being broken away for convenience of illustration and the disconnect device being shown mounted on a support. A portion of the coupling and the disconnect device is shown in broken line in tilted position.

FIGURE 2 is a top plan view of the coupling and the coupling disconnect device.

FIGURE 3 is a vertical section taken along the line 3—3 of FIGURE 2.

FIGURE 4 is a vertical section of the pivotal support taken along the line 4—4 of FIGURE 1.

Referring now to the drawings, the coupling with which the connect and disconnect mechanism of the present invention is designed to operate is formed of a female coupling half 10 and a male coupling half 11. The female coupling half 10 includes an inner body 12 and an outer body 14 threadedly engaged with the inner body and extending beyond the inner body to provide a bore 15 for reception of the male coupling half 11. The outer body 14 is provided with a series of radially extending holes 16 for reception of steel balls, one ball 17 being shown. A circumferential groove 19 is provided on the outer periphery of the male coupling half 11 for receiving the balls when the coupling halves are completely engaged as shown in FIGURE 1.

In accordance with usual practice, each coupling half is provided with a check valve member (not shown) biased into engagement with a valve seat to close the line against loss of fluid upon uncoupling. These valve members project beyond the ends of the male coupling half 11 and the inner body 12 of the female coupling half so that when the confronting portions of the coupling halves are engaged, the valve members engage with each other and hold the valve members off their seats to establish fluid connection through the coupling. Upon separation of the coupling halves, the valve members move against their seats so as to close the line and prevent leakage of hydraulic oil and entrance of dirt. This is a conventional type of coupling shown in detail in Hu C. Brown U.S. patent application S.N. 354,540.

A sleeve 20 is provided on the outside of the outer body 14, this sleeve being mounted for reciprocation on that body and biased forwardly against a shoulder 21 by a spring 22. When the sleeve 20 is biased forwardly against the shoulder 21, the ball 17 is held within the groove 19 of the coupling half 11 to hold the two coupling halves in engagement against spring pressure and the pressure of the hydraulic fluid. Upon retracting the sleeve 20 against the bias of the spring 22, a circumferential groove 24 within the sleeve registers with the balls 17 to permit the balls to move radially outwardly and release the male coupling half 11 for uncoupling. The coupling and the function of the sleeve are generally of the type shown in U.S. Patent No. 2,548,528.

The coupling half 10 is placed on the end of a hose 25 connected with the tractor hydraulic system (not shown). The coupling half 11 is received on the end of a hose 26 leading to an implement or other device to be controlled.

Referring now to FIGURE 1, the coupling female half 10 is supported by a member 27 which preferably is provided with a pair of upstanding flanges 29. One end of the member 27 is provided with a clamping portion 30 which is adapted to be clamped about the sleeve 20 by a bolt and nut 31 and 32. A portion of the member 27 spaced from the clamping portion provides a fulcrum for a lever 34. Preferably, the lever 34 has a bifurcated lower end extending along each side of the inner body 12 and pivotally connected to the member 27 by a bolt 36 passing through the flanges 29—29 of the member. If desired, a bushing 37 about the bolt 36 may be used to provide a bearing and to prevent overtightening of the bolt 36 and binding of the lever. The operating portion 39 of the lever extends above the female coupling half 10 at an acute angle to the axis thereof, as indicated in the drawings. Preferably, the lever 34 is formed of a sheet metal stamping.

The channel-shaped member 27 is pivotally mounted on a horizontal supporting bracket 40, which may be supported adjacent the rear of the tractor. Preferably, the channel-shaped member 27 is pivotally mounted by a bolt 41 extending through a hole 42 in the bracket 40. A sleeve 44 may be placed about the bolt 41 to extend between the head of the bolt and the member 27, the hole 42 being somewhat larger than the sleeve to permit vertical rocking of the member 27 on the bracket 40.

A helical spring 45 about the sleeve 44 and extending between the head of the bolt 41 and the underside of the bracket 40 biases the channel-spaced member 27 into level position against the upper surface of the bracket. As indicated in FIGURE 1, however, upon a downward pull on the implement-connected hose 26, the entire coupling and the member 27 are free to rock about the rear edge 46 of the bracket so as to cause the pull on the hose to extend more nearly axially of the coupling. At the same time, the pivotal mounting of the member 27 on the bracket 40 permits the coupling to swivel on the bracket 40 in response to any side pull on the hose 26.

Upon excess pull on the hose 26 due, for example, to a trailed implement becoming mechanically uncoupled from the tractor, the balance of the female coupling half 10 will be moved rearwardly relative to the sleeve 20 in the usual manner, the sleeve spring 20 being compressed. When the coupling is moved rearwardly sufficiently that the balls 17 may move into the groove 24, the male coupling half 11 will be released in the usual manner of couplings of this type. The uncoupling mechanism of the present invention does not interfere with this action.

When it is desired to manually couple or uncouple the coupling, the operating portion 39 of the lever 34 may be depressed toward the coupling, the bifurcated lower end portion 35 of the lever engaging against the end of the outer body 14 of the female coupling half and forcing this portion rearwardly relative to the sleeve 20. While the lever is in this position, the male coupling half 11 is released by the ball 17 and may be inserted into or withdrawn from the outer body 14 of the coupling. When coupling, the only force required is that necessary to displace the check valves in the ends of the inner body 12 and the male coupling half 11.

In the event that either or both hoses 25 and 26 have high pressure therein requiring excess force to unseat the check valves against this pressure, the coupling may be made by first partially unscrewing the outer body 14 from the inner body 12 by engaging a wrench on the flats 47 of the outer body, the lower end 35 of the lever 34 holding the inner body against rotation, as indicated in FIGURE 3. After unscrewing the outer body from the inner body sufficiently to permit the coupling halves to be coupled in the usual manner but without unseating the check valves, the outer body can again be tightened on the inner body, the mechanical advantage obtained by the wrench and screw threads providing the necessary force for unseating the check valves.

I claim:

1. A hose coupling support and connect and disconnect mechanism for a hose coupling having a male and female coupling half retained in coupled relation by displaceable balls carried in the female half and engaged with the male half by a spring-biased sleeve mounted for reciprocation on the female half, said mechanism comprising: an elongated channel-shaped member having upstanding flanges, with the base of said member lying in a horizontal plane and the open side thereof facing upwardly, clamping means attached to one end of said member, said clamping means secured about the spring-biased sleeve for supporting the female coupling half in a position extending longitudinally above the channel-shaped member, lever means pivotally mounted adjacent the other end of the channel-shaped member for rotation about a horizontal axis transverse to said flanges and said female coupling half, said lever means having a bifurcated portion engaged about said female coupling half and an operating arm portion extending upwardly with respect to the longitudinal axis of the female coupling half from said bifurcated portion, the bifurcated portion axially displacing the female coupling half relative to the spring-biased sleeve upon rotation of the lever operating arm portion about the pivot in a direction towards the spring-biased sleeve so as to permit the balls to move outwardly, whereby said male coupling half may be coupled to or uncoupled from said female coupling half, the channel-shaped member being mounted for limited substantially universal movement on a flat, horizontal support at a single point intermediate the lever means and clamping means by a vertically extending pivot means, and resilient means restraining motion of said channel-shaped member in any plane of movement about said pivot means.

2. A hose coupling support and connect and disconnect mechanism as claimed in claim 1 in which the pivot means includes a vertically extending bolt-and-nut assembly received within aligned holes in the channel-shaped member and support and a helical spring is received about the bolt below the support to bias the channel-shaped member against the support and restrain the substantially limited universal movement of the channel-shaped member on the support.

3. A hose coupling support and connect and disconnect mechanism as claimed in claim 1 in which the operating arm portion of the lever means extends upwardly above the coupling female half at an acute angle to the axis thereof.

References Cited

UNITED STATES PATENTS 2,699,961  1/1955  Omon et al. _____ 285—1 X
3,279,827  10/1966  Brown _____ 285—1

FOREIGN PATENTS 1,115,298  12/1955  France.
329,661  9/1935  Italy.

EDWARD C. ALLEN, *Primary Examiner.*

CARL W. TOMLIN, *Examiner.*

R. G. BERKLEY, *Assistant Examiner.*